(12) United States Patent
Huck et al.

(10) Patent No.: US 7,027,671 B2
(45) Date of Patent: Apr. 11, 2006

(54) POLARIZED-LIGHT-EMITTING WAVEGUIDE, ILLUMINATION ARRANGEMENT AND DISPLAY DEVICE COMPRISING SUCH

(75) Inventors: Hubertina Petronella Maria Huck, Eindhoven (NL); Hugo Johan Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 11 days.

(21) Appl. No.: 10/507,861

(22) PCT Filed: Mar. 3, 2002

(86) PCT No.: PCT/IB03/00960

§ 371 (c)(1),
(2), (4) Date: Sep. 14, 2004

(87) PCT Pub. No.: WO03/078892

PCT Pub. Date: Sep. 25, 2003

(65) Prior Publication Data

US 2005/0123229 A1    Jun. 9, 2005

(30) Foreign Application Priority Data

Mar. 18, 2002    (EP) .................. 02076065

(51) Int. Cl.
*G02B 6/00*    (2006.01)

(52) U.S. Cl. .................. 385/11; 385/146; 385/901; 362/19

(58) Field of Classification Search .................. 385/11, 385/901, 146; 362/19
See application file for complete search history.

(56) References Cited

U.S. PATENT DOCUMENTS 6,335,999 B1 *   1/2002   Winston et al. ............. 385/146

FOREIGN PATENT DOCUMENTS

| WO | WO 97 11404 | 3/1997 |
| WO | WO 01 51849 | 7/2001 |
| WO | WO 01 53745 | 7/2001 |

* cited by examiner

*Primary Examiner*—Akm Enayet Ullah
*Assistant Examiner*—James D. Stein
(74) *Attorney, Agent, or Firm*—Kevin Fortin (57) ABSTRACT

A side-lit illumination arrangement comprises a polarized-light-emitting waveguide comprising a polarization-selective beam-splitting interface formed at an interface of a waveguiding layer and a polarization-selection layer. In order to avoid alignment problems occurring during the manufacture of the waveguide which impair the proper functioning of the polarization-selective beam-splitting interface, the polarization-selective beam-splitting interface is planar. Waveguided light polarized and transmitted by the polarization-selective beam-splitting interface into the polarization-selection layer is coupled out by a relief-structured surface via an exit surface. Display devices having such waveguides, in particular if used in a front light, have a high brightness and efficiency.

2 Claims, 3 Drawing Sheets

POLARIZED-LIGHT-EMITTING WAVEGUIDE, ILLUMINATION ARRANGEMENT AND DISPLAY DEVICE COMPRISING SUCH

This application is a national stage entry of PCT/JB03/00960 filed in Mar. 3, 2003.

The invention relates to a polarized-light-emitting waveguide having an exit surface and an entry side face, in particular a polarized-light-emitting waveguide for use in a front-light illumination arrangement.

The invention further relates to an illumination arrangement comprising a polarized-light-emitting waveguide and a display device comprising such an illumination arrangement.

A waveguide as mentioned in the opening paragraph is disclosed in U.S. Pat. No. 5,729,311. The optical waveguide disclosed therein is part of a side-lit back-light illumination system for a display device. It has recesses which are filled with a material which has optical properties different from those of the optical waveguide Where the optical waveguide and material contained in the recesses meet, a relief structured interface is formed which, as optically different material is present on either side thereof, is adapted to redirect any light incident thereon in the direction of the exit surface. In addition, at least the optical waveguide or the material present in the recesses is selected to be optically anisotropic to allow polarization-selective beam reflection and refraction at the interface when unpolarized waveguided light is incident thereon. As optically anisotropic material liquid crystal material may be suitably used.

With respect to manufacture, U.S. Pat. No. 5,729,311 suggests to provide a waveguide having recesses in and fill the recesses with liquid crystalline material which is then aligned to induce optical anisotropy and then curing that material to form a liquid crystalline layer. The inventors of the present invention have observed that the presence of the recesses makes it difficult to induce the desired alignment of the liquid crystalline material present in the recesses and maintain the alignment during curing. Alignment is critical in achieving the desired polarization selection. Defects in alignment lead to unsatisfactory polarization separation and other undesirable optical effects such as parasitic scattering. WO 99/22268 discloses a similar waveguide and, accordingly, has similar disadvantages.

It is an object of the invention to, inter alia, take away these disadvantages and provide a polarized-light-emitting waveguide which can be reliably manufactured in a simple manner. The waveguide should be suitable for use in a back-light illumination arrangement, but in particular be suitable for use in a front-light arrangement. The waveguide is to be a light source of polarized light of high efficiency and/or brightness.

These and other objects are achieved by means of a polarized-light-emitting waveguide comprising:

an entry side face via which, in operation, light from a light source arranged adjacent the entry side face enters the waveguide;

a waveguiding layer for waveguiding light entered via the entry surface;

an exit surface via which, in operation, polarized light exits the waveguide;

a polarization-selection layer provided adjacent to the waveguiding layer and, preferably, opposite the exit surface;

a planar polarization-selective beam-splitting interface formed at an interface of the waveguiding layer and the polarization-selection layer; and a relief-structured surface which is situated on the polarization-selection layer side of and is spatially separated from the polarization-selective beam-splitting interface, the relief-structured surface being adapted to redirect light polarized by the beam-splitting interface and incident on the relief-structured surface, via the exit surface, out of the waveguide.

The polarized-light-emitting waveguide in accordance with the invention has a relief structured surface which is not coincident, as is the case in the known waveguide of U.S. Pat. No. 5,729,311, but is characterized in that the relief-structured surface is spatially separated from the polarization-selective beam-splitting interface. With the relief structure being accommodated elsewhere in the waveguide, the polarization-selective beam-splitting interface can be chosen planar and, accordingly, the alignment problems caused by the recesses in the prior art waveguide are solved. After all, aligning liquid crystalline material defect free on a planar substrate is well-established technology it is done routinely in the manufacture of liquid crystal (LC) displays. Thus, a polarized-light-emitting waveguide which can be manufactured in a more reliable and simple manner is obtained. The improvement in manufacturability does not compromise the optical performance of the waveguide and, accordingly, the waveguide in accordance with the invention is a highly efficient and/or bright light source of polarized light. As the waveguide in accordance with the invention may be entirely made of transparent materials the waveguide is not only suitable for use in side-lit back-light arrangements but also in side-lit front-light arrangements.

In operation, light from a light source arranged adjacent the entry side face enters the waveguiding layer via the entry side face. The light thus entered is waveguided by total internal reflection (TIR) down the waveguide and in doing so it is incident on the polarization-selective beam-splitting interface. The polarization-selective beam-splitting interface is adapted to totally internally reflect light of a first polarization and to transmit light of a second polarization thus splitting an incident light beam into two separate light beams of complementary polarization. The light of the second polarization thus selectively admitted to the polarization-separation layer travels towards the relief-structured surface, is incident thereon and is then redirected, via the exit surface, out of the waveguide. The angle at which the light is redirected is such that the redirected light is not captured by the waveguiding layer and, accordingly, the redirected light exits the light via the exit surface. In particular, the relief-structured surface may be located on the same side or even be coincident with the polarization-selection layer, but preferably the relief-structured surface is located on the side of the polarization-selection layer opposite the exit surface. The light of the first polarization which is totally internally reflected is waveguided further down the waveguide and is available for recycling. Recycling aims at increasing the efficiency of the polarized-light-emitting waveguide by converting the light of the first polarization into unpolarized light (depolarization) or into light of the second polarization and then offering the light thus converted to the beam-splitting interface. Means to achieve such recycling are known in the art as such.

The polarization-selective beam-splitting interface may be adapted to split an incident beam of waveguided light into separate beams of linearly polarized light and thus obtaining a polarized-light-emitting waveguide which emits linearly polarized light. Such interfaces are known per se, see e.g. U.S. Pat. Nos. 5,845,035 and 5,808,709 and WO 01/53745. Alternatively, the polarized-light-emitting waveguide may emit circularly polarized light. In order to achieve circular-polarized light emission, the waveguide is further characterized in that the polarization-selection layer is adapted to transmit circularly polarized light of a first handedness and to reflect circularly polarized light having a handedness complementary to the first handedness in a selected wavelength range and, optionally, the relief-structured surface and planar polarization-selective beam-splitting interface are replaced by a relief-structured polarization-selective beam-splitting interface.

Such polarization-selection layers are known in the art per se, see eg EP 606,940, although such known polarization-selection layers are in particular adapted to reflect visible light at normal or near-normal as opposed to waveguiding angles. In the prior art, such polarization-selection layers are referred to as (broadband) cholesteric or chiral nematic or reflective polarizers. In a particular embodiment of the circular polarized light emitting waveguide, the separate relief-structured surface and planar polarization-selective beam-splitting interface are integrated to form a relief-structured polarization-selective beam-splitting interface.

In order to obtain a polarization-selective beam-splitting interface, the waveguiding layer and/or the polarization-selection layer is formed from optically anisotropic material. If both the waveguiding and polarization-selection layer are selected to be optically anisotropic a maximal number of degrees of freedom is available, eg four refractive indices can be independently varied, to optimize the performance of the waveguide. From a manufacturing and cost point of view however it is preferable to reduce the number of optically anisotropic layers. Inter alia because the waveguiding is performed in the waveguiding layer and light has to travel over large distances, it is preferred that an optically isotropic waveguiding layer is combined with an optically anisotropic polarization-selection layer.

The optically anisotropic polarization-selection layer may be an inorganic birefringent layer, such inorganic layers being known as such, or an optically anisotropic organic layer, in particular a stretched polymer layer, which are also known as such. Preferably, the polarization-selection layer is a liquid crystal polymer layer.

The relief-structured surface may be adapted to redirect light by means of reflection, such adaptation being realized by, for example, a micro-grooved surface, or by means of diffraction, such adaptation being realized by, for example, a grating.

It is preferred that the relief structured surface is a free boundary of the waveguide meaning that relief-structured surface is an air/waveguide interface. Redirection of the light is most efficient if the refractive difference experienced at the surface, which is on the low refractive index side is achieved by using air.

In order to minimize the number of layers the waveguide is comprised of, the relief structure is preferably provided on a major surface of the polarization-selection layer. Alignment defects in the liquid crystal layer of the prior art waveguide are less relevant as, in accordance with the invention, no polarization selection takes place at the relief structured interface. However, for other reasons, such as to improve alignment of liquid crystal material at the polarization-selective beam-splitting interface and/or to obviate the need to apply an alignment layer at the beam-splitting interface and/or to obtain the ability to pre-form the relief-structured interface and/or to provide a relief structure in an optically isotropic layer, it is preferred to include a separate outcoupling layer having a major surface in which the relief structure is accommodated, the outcoupling layer being provided on the side of the polarization-selection layer facing away from the exit surface.

Waveguides having relief-structured surfaces for redirecting light are known as such. See eg U.S. Pat. No. 5,608,550.

In a preferred embodiment, the invention relates to a side-lit illumination arrangement comprising a waveguide in accordance with the invention and a light source arranged adjacent the entry side face of the waveguide.

In a further preferred embodiment, the side-lit illumination arrangement is part of a display device. In particular, the invention relates to a front-lit display device comprising a display panel for modulating polarized light in response to an applied voltage and a side-lit front-light arrangement comprising a waveguide in accordance with the invention for supplying polarized light to the display panel.

The waveguide in accordance with the invention may be manufactured in accordance with a method which involves only method steps which are as such conventional. The relief structure may be made by embossing or replication molding, more specifically by means of polymerizing polymerizable liquid crystal material in a mold. In case the relief structure is provided as part of a separate outcoupling layer it may be conveniently formed using injection molding or casting.

These and other aspects will be elucidated in more detail in the drawings and the embodiments presented hereinbelow.

Figure 1:
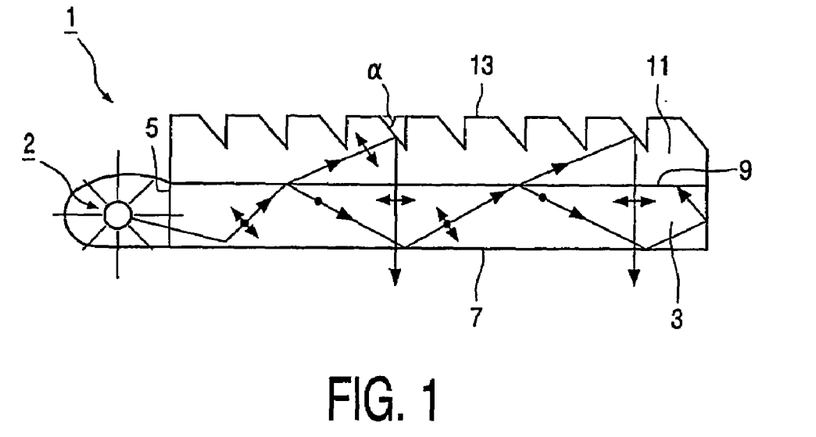
FIG. 1 shows, schematically, in a cross-sectional view an embodiment of a polarized-light-emitting waveguide in accordance with the invention.

The waveguide 1 has a light source 2 arranged adjacent to it, the combination forming an side-lit illumination arrangement in accordance with the invention.

The light source 2 can be of any type, for example a cold cathode fluorescent lamp (CCFL) or a light-emitting diode or an array of such diodes or lamps. The light source may emit colored or white light, white light being emitted for example using triplets of lamps each triplet consisting of a red, green and blue lamp, optionally operable in a time-sequential manner.

The light source 2 is preferably line-shaped which may be also realized using a point source in combination with a light pipe. Although in the present embodiment the light source extends along a single side face this is by no means essential; light sources may also be arranged near further side faces.

The light source 2 typically emits unpolarized light and is in general combined with a reflector to direct light emitted by the light source 2 which travels away from the waveguide towards the waveguide.

The waveguide 1 has an entry side face 5 via which, in operation, light from the light source 2 arranged adjacent the entry side face 5 enters the waveguide 1. As shown in FIG. 1, the entry side face is an integral part of the waveguiding layer 3 but this is by no means essential. The entry side face may be provided as part of a separate element and/or, although this is not preferred as this results in admitting unpolarized light to the relief structured surface, corresponding side faces of the polarization-selection layer 11 may also serve as an additional entry side face. The entry side face 5 may be at right angles to the major surface of the waveguiding layer 3 or may be inclined to it to enlarge the area available for receiving light from the light source 2. Furthermore, as known in the art as such, it may be combined with optical elements (not shown) such as a collimator or a lens to optimize the light in-coupling with respect to eg the amount light coupled in and the angular range of light coupled in.

The waveguiding layer 3 waveguides light which has entered the waveguide 1 via the entry side face 5 down the waveguide 1 by means of total internal reflection (TIR). TIR is between two surfaces and, according to the present invention, it is essential that one of these surfaces is a polarization-selective beam-splitting interface, which in the present embodiment of waveguide 1 is formed by the surface 9. In the present embodiment the second surface involved in TIR is formed by the exit surface 7, but this is by no means essential, other surfaces may be used for this purpose as well.

Figure 2:
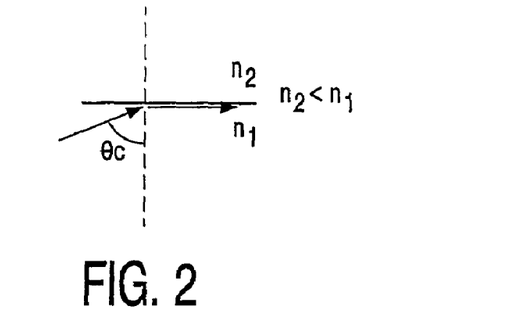
FIG. 2 shows, schematically, total internal reflection of a light ray incident at the critical angle $\theta_c$.

Referring to FIG. 2, as is well known in the art, TIR is achieved if light traveling in a first medium, having a refractive index $n_1$, is incident on an interface which the first medium forms with a second medium having a refractive index $n_2$, where $n_1/n_2>1.0$ with an angle of incidence which exceeds the critical angle $\theta_c$. Using Snell's law, $\sin \theta_c = n_2/n_1 \sin 90° = n_2/n_1$. The critical angle is measured with respect to the normal of the interface at the point of incidence.

In accordance with the invention, the polarization-selective beam-splitting interface 9 is adapted to totally internally reflect light of a first polarization and transmit light of a second polarization. In the present embodiment, but this is not essential, light of the first polarization is s-polarized (indicated by the fat bullets in FIG. 1) and the transmitted light is p-polarized (indicated by the double-headed arrow in FIG. 1). Alternatively, in another embodiment s-polarized light may be transmitted and p-polarized light reflected. Instead of being selective for linearly polarized light, the polarization-selective beam-splitting interface 9 may also adapted to polarization-selectively split a circularly polarized light beam.

To achieve the desired polarization selection into linearly polarized components, the waveguiding layer and/or the polarization-selection layer is optically anisotropic. Specifically, if $n_{p1}/n_{w1}<1.0$ and $n_{p2}/n_{w2}>=1.0$, where $n_{p1}$ and $n_{p2}$ are the refractive indices of the polarization-selection layer 11 experienced by waveguided light of the first and second polarization respectively, and $n_{w1}$ and $n_{w2}$ are the refractive indices of the waveguiding layer 3 experienced by waveguided light of the first and second polarization respectively. More specifically, to achieve TIR at interface 9 for all light having the first polarization which is admitted to the waveguide, the light source 2 and waveguide 1 are to co-operate such that all light coupled in via the entry side 5 is incident on the interface 9 at an angle $\theta$ which satisfies $\sin \theta >= \sin \theta_c = n_{p1}/n_{w1}$. In addition, to avoid loss of light of either polarization at the surface 7 only light incident at an angle $\theta$ satisfying $\sin \theta >= \sin \theta_c = \max(n_{e1}/n_{w1}, n_{e2}/n_{w2})$ where $n_{e1}$, $n_{e2}$ is the refractive index light of the first respectively second polarization experiences in the medium adjacent the surface 7 of the waveguiding layer 3. If, as in the present embodiment, the medium adjacent the surface 7 is air then $\sin \theta >= \sin \theta_c = \max(1.0/n_{w1}, 1.0/n_{w2})$.

To obtain a polarization-selective beam-splitting interface it is sufficient that either the polarization-selection layer 11 or the waveguiding layer 3 is optically anisotropic and the other is optically isotropic. Preferably, the waveguiding layer 3 is selected be optically isotropic in which case the above set of conditions to achieve TIR reduce to $n_{p1}/n_w < 1.0$ and $n_{p2}/n_w > 1.0$ and $\sin \theta >= \sin \theta_c = n_{p1}/n_w$ or, identically, to $n_{p1} < n_w \sin \theta_c = n_{p1}/n_w$ and $\sin \theta >= \sin \theta_c = 1.0/n_w$, which in turn reduces to $n_{p1}/n_w, n_{p2}/n_w$. In order to minimize reflection off the beam-splitting interface 9 of the light to be transmitted by the interface 9, that is light of the second polarization, the refractive index of the waveguiding layer 3 and the polarization-selection layer 11 experienced by light of the second polarization is preferably substantially equal to one and other, that is $n_{p2}/n_w$ equal to about 1.0 or $n_{p2}/n_w < 0.99$.

Optically isotropic material may be used to form either the waveguiding layer 3 or the polarization-selection layer 11, but preferably the waveguiding layer 3. Any inorganic material transparent in the region in which the waveguide 1 is to be operated such as glass or ceramic or silica-based polymers or hydrolytically condensed silane compounds may be suitably used. Organic material, such as a polymeric material, may also be used as optically isotropic material. In practice materials which are perfectly optically isotropic are difficult to obtain, to some extent optical imperfections which create, locally, optical anisotropy are always present. In the context of the invention, a material is considered optically isotropic if it has fluctuations in refractive index (if any such fluctuations are present) in size and/or direction which are random on substantially any length scale. Examples are well known to those skilled in the art and include in the case of polymers polycarbonates, poly(meth) acrylates, polystyrenes, cyclic olephine polymers, polyestersulphones, polythiolenes, polysiloxanes, polyimides, polyamides, polyurethanes and the like. The polymer may be a thermoplastic or a thermosetting polymer, a crosslinked polymer or linear chain polymer, such as a side-chain polymer, which may or may not be slightly cross-linked. The use of polymeric material, in particular optically isotropic polymeric material, has the advantage that it can be shaped easily to include further functionality, such as attachment means for assembly of the waveguide into a display and means for fastening the light source 2 to the waveguide 1, and thus achieve integration. Shaping may be performed by conventional methods such as injection molding, in-mold replication and the like. Polymeric materials are particularly suitable to form flexible, bendable, foldable or even wrappable waveguides.

Optically isotropic material may be processed into a shaped object including the waveguiding layer 3 or the polarization-selection layer 11 in any manner which is conventional for that particular optically isotropic material. In the case of a polymeric material shaping may be performed, depending on the particular polymer, by injection molding, extrusion, casting in-mold replication coat and cure methods and the like.

Optically anisotropic material may be used to form the waveguiding layer 3 and/or the polarization-selection layer 11, but preferably only the polarization-selection layer 11 is formed from such material.

Optical anisotropy may be characterized by an optical indicatrix, a second rank tensor, which if represented by a 3 by 3 matrix in diagonal form, has the refractive indices $n_x$, $n_y$, and $n_z$, on the diagonal which represent the refractive indices in three orthogonal spatial directions. A material is considered optically anisotropic if is has, on a desired length scale, differences in refractive index (in size and/or direction) which are substantial, say at least 0.03, and not random. For the purpose of the present invention, it is sufficient that the refractive indices in the direction normal to the principal direction if waveguiding say $n_y$, and $n_z$ differ in value, and the refractive index in the waveguiding, $n_x$, is equal to one of the other. Accordingly, a birefringent material which is a material characterized by two different refractive indices, specifically in one direction by the extraordinary index $n_e$ and in the directions orthogonal thereto by the ordinary refractive index $n_o$, may be suitably used as optically anisotropic material in the waveguide in accordance with the invention, in which case $n_y=n_z=n_o$ and $n_x=n_e$.

Optically anisotropic material may be inorganic such as inorganic birefringent crystals or organic, such as liquid crystalline material. In order to obtain layers of large surface area, polymeric optically anisotropic materials are preferred. Optically anisotropic polymeric material may be stretched polymeric material, stretched to obtain a uniaxial or biaxial or birefringent orientation, or a liquid crystal polymeric material.

Examples of polymers which may be stretched to obtain an optically anisotropic material, such as a birefringent material, include, in particular, polyethylenenaphthalate and polyethyleneterephthalate. Further examples of stretched polymers and methods to manufacture such stretched polymers and methods to manufacture layers thereof are described in U.S. Pat. No. 5,825,543, in particular column 12 line 50 to column 14 line 67.

As is well known in the art, optically anisotropic liquid crystal polymers may be formed by polymerizing monomers to form the liquid crystal polymer and then orient the liquid crystal polymer to render the liquid crystal polymer optically anisotropic, which may be performed by heating the polymer above its glass transition temperature, orient by subjecting the melt thus obtained by conventional orientation means such as an alignment layer, an electric field or magnetic field. Alternatively, the polymer may be oriented by flow-induced orientation means. Orientation after the polymer has been formed is particularly suitable for thermoplastic LC polymers. Such polymers are typically linear chain polymers in which the LC mesogens responsible for the anisotropic orientation are incorporated in the main chain or the side chain of the polymer.

In another embodiment of the optically anisotropic LC polymer, known as such in the art as an in-situ photopolymerized LC polymer, a polymerizable LC monomer composition is oriented using conventional alignment means and then the oriented composition is polymerized while maintaining the induced orientation. This method may be used for linear chain LC polymers but is particularly suitable for thermosetting crosslinked polymers. Suitable LC monomers, as such known in the art, include LC (meth)acrylates, mono and di-(meth)acrylates in particular, thiol-enes, epoxides, vinyl-ethers, oxetanes and cinnamates.

The LC polymer may have any orientation suitable to implement the polarization beam-splitting interface, in particular a nematic or a discotic orientation may be used to obtain a birefringent material. If circular polarized light is required, chiral nematic or cholesteric materials may be used. As is known such material may for example be obtained by adding a chiral compound to a birefringent nematic material.

The waveguiding layer 3 may be made of optically anisotropic material but preferably is made of isotropic material. For display applications the waveguiding layer is typically plate-shaped, the surface area being selected in accordance with the size of the display panel. The thickness of the waveguiding layer 3 is selected in combination with the opening angle of the light source 2 to maximize the amount of light coupled in via the entry side face. Typically, the thickness is about 0.1 mm to about 5 mm, preferably 0.5 mm to about 2 mm. Typically, the waveguiding layer 3 is self-supporting and is capable of serving as a substrate for the provision of the polarization-selection layer 11. Its major surfaces may be arranged parallel as shown in FIG. 1 but this is not essential. It may alternatively be wedge-shaped or have a stepped major surface to control the spatial distribution of light coupled out.

The polarization-selection layer 11 is preferably made of an optically anisotropic material. The thickness of the polarization-selection layer 11 is not critical. The waveguiding and light in-coupling functionality being provided by the waveguiding layer, the thickness may be quite small, say down to 0.1 μm. The thickness may also be 0.50 μm or 1.0 μm or more. In case the polarization-selection layer 11 is made from stretched polymer, the thickness is preferably at least 50 μm to avoid rupture of the layer 11 during manufacture or laminating thereof. In-situ polymerized LC polymers can be manufactured in much thinner layers if required, say down to 0.1 μm.

The polarization-selection layer 11 has a planar major surface which interfaces with a planar major surface of the waveguiding layer 3 to form a planar polarization-selective beam-splitting interface 9. Having a planar polarization-selective beam-splitting interface as opposed to a polarization-selective beam-splitting interface which has a relief structure alignment problems of optically anisotropic material associated with the relief structured polarization-selective beam-splitting interface are avoided. The polarization-selective beam-splitting interface 9 is adapted to totally internally reflect waveguided light of the first polarization and transmit waveguided light of the second polarization. The efficiency of the polarization-selective beam-splitting interface 9, measured in terms of the range of angles of waveguided light which can be polarization-selected, is a function of the difference in refractive index light to be totally internally reflected experiences. Specifically, the higher the difference the smaller the critical angle $\theta_c$. Typically, the refractive index difference $n_{w1}-n_{p1}$ is at least 0.05 or, preferably, at least 0.1. Since the choice of materials in which the difference is larger 0.2 is limited, the difference is preferably less than 0.2. On the other hand, to reduce undesirable reflections, the refractive index $n_{w2}-n_{p2}$ experienced by the transmitted light is preferably less than 0.1 or better less than 0.05.

Optionally, the waveguiding layer 3 and/or the polarization-selection layer 11 may include further layers of which a major surface participates in the formation of the polarization-selective beam-splitting interface 9. For example, in the case of polarization-selection layer made of LC polymer in-situ polymerized on the waveguiding layer 3, the waveguiding layer 3 may include an alignment layer to obtain and maintain the desired alignment of the LC monomeric material to be polymerized. As another example, in order to obtain a contact surface of optical quality and/or good adhesion, it may be necessary to use an optical adhesive.

The waveguide 1 further comprises a relief-structured surface 13. The surface 13 is adapted to redirect light polarized by the beam-splitting interface 9, which in the present embodiment is p-polarized light, towards the exit surface 7. The surface 13 is situated on the polarization-selection layer side of and is spatially separated from the beam-splitting interface 9.

The relief-structured surface 23 may be a surface which redirects the polarized light admitted to the polarization-selection layer 11 by the polarization-selective beam-splitting interface 9 towards the exit surface 7 by means of diffraction, employing suitable diffraction means such as a grating or a relief-structured hologram. The grating may be a ruled grating or a holographic grating. Waveguides comprising such diffracting elements are known per se in the art.

In the embodiment shown in FIG. 1, the relief-structured surface 23 comprises notches or micro-grooves extending parallel to one and other and the entry side face 5 which redirect the polarized light admitted to the polarization-selection layer 11 by the polarization-selective beam-splitting interface 9 by reflection. Waveguides comprising such micro-grooved surfaces are known as such and for details reference is made to eg U.S. Pat. No. 5,608,550. Typically, the micro-grooves are triangular-shaped and have a depth of less than 100 µm. Preferably the depth is 5 to 50 µm or still better 8 to 15 µm. The angle α may varies typically between 10° and 60°, preferably 15° to 50°. An optimum angle is about 45°. The pitch of the grooves, that is the mutual (center-to-center) distance between grooves, is 10 µm to 1 mm, preferably 50 µm to 500 µm, or better 100 µm to 400 µm. In order to compensate for the light loss occurring in going from the entry side face to the opposite end face, and thus achieve a more uniform light outcoupling across the exit surface 7, the pitch of the grooves may be made non-uniform, eg decreased in going from the entry side face 5 to the opposite of the end face of the waveguiding layer 3.

In the present embodiment of waveguide 1, the relief structured surface 23 is a free surface meaning that air is present adjacent to one side of it. Although having such a free surface is by no means essential, it has the advantage that the difference in refractive index is maximized because the refractive index of air is substantially equal to the minimum value of 1.0. The larger the refractive index, the more efficient the relief-structured surface 13 redirects the light towards the exit surface 7.

In the waveguide 1 the relief-structured surface 13 is accommodated in a major surface of the polarization-selection layer 11. Although by no means essential in the broadest sense of the invention, this has the advantage that the polarized light emission is realized using two different layers only which results in a particularly compact and light weight polarized-light-emitting waveguide. Since no polarization selection takes place at the relief-structured surface 13, any alignment errors which may be induced during manufacture are of lesser consequence than they would be in case the alignment error would occur near a polarization-selective beam-splitting interface.

Figure 3:
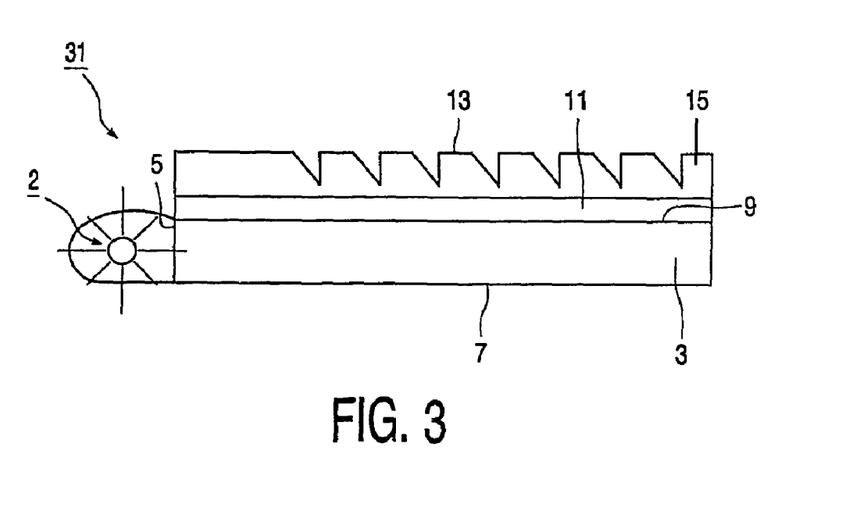
FIG. 3 shows, schematically, in a cross-sectional view a further embodiment of a polarized-light-emitting waveguide in accordance with the invention.

By contrast, the waveguide 31 shown in FIG. 3 comprises an outcoupling layer 15 having a major surface in which the relief-structured surface 13 is accommodated. The outcoupling layer 15 is provided on the side of the polarization-selection layer 11 facing away from the exit surface 7. Although in principle the outcoupling layer 15 may be made of optically anisotropic material it is preferred that it is made of optically isotropic material, examples of suitable such material having been described hereinabove. To reduce parasitic reflections at the interface between the polarization-selection layer 11 and the outcoupling layer 15, the refractive index of the polarization-selection layer 11 for polarized light admitted to the polarization-selection layer 11 is preferably matched to the refractive index of the outcoupling layer 15. Accommodating the relief-structured surface 13 in a separate, optically isotropic, outcoupling layer 15 has, inter alia, the advantage that the risk of inducing alignment defects is eliminated. Furthermore, with the microgrooves being accommodated in the outcoupling layer 15, the typical depth of which is 100 µm, the thickness of the polarization-selection layer 11 can be significantly reduced which in turn reduces the cost of the waveguide as in general optically isotropic material is considerably less expensive than anisotropic material. Also, since the light travels only a short distance through the light outcoupling layer 15, any optical defects caused by the manufacture of the relief-structured surface 13 are inconsequential relatively to the situation where the relief-structured surface is accommodated in the waveguiding layer 3. In case the polarization-selection layer 11 is formed from in-situ polymerized LC polymer, the surface of the outcoupling layer 15 facing the exit surface 7 may be provided with an alignment layer thus securing proper alignment on the LC monomers to be polymerized. As a result, there may even be no need to include an alignment layer at the polarization-selective beam-splitting interface 9 thus avoiding any possible adverse effect of such an alignment layer on the polarization-selective beam-splitting interface 9.

Referring to FIGS. 2 and 3, the exit surface 7 is a major surface through which the polarized light redirected by the relief-structured surface 13 is coupled out of the waveguide towards the object it is supposed to illuminate, eg a display. In the waveguides 1 and 31 the exit surface 7 conveniently coincides with a major surface of the waveguiding layer 3 but this is by no means essential. The exit surface 7 is planar but may also be provided with a relief structure to modify the distribution of the light coupled out such as the angular distribution and/or intensity distribution along the exit surface. Waveguides comprising such relief structures are known in the art as such and include microlens and prism arrays. Obviously, the relief structure may also be provided by means of a separate layer detached from or laminated onto the waveguide.

In order to improve the efficiency of the polarized-light-emitting waveguide, the polarization of the light which remains trapped in the waveguiding layer 3 may be converted into light having a polarization orthogonal thereto and offering the light thus converted to the polarization-selective beam-splitting interface 9 again. Because waveguided light travels substantial distances through an optical dense medium, optical imperfections which are, in practice, to some extent always present serve as an effective means for depolarizing polarized light. An example of such optical imperfections is stress-induced birefringence caused during manufacture of the waveguiding layer. In addition, to enhance the efficiency of the waveguide the end face opposite the entry side face 5 may be provided by depolarizing reflecting means, such as a diffuse depolarizing mirror or polarization-inversion reflecting means, such as a polarization mirror in combination with a quarter wave retarder, to direct light of the first polarization which otherwise leave the waveguiding layer 3 at the end face back into waveguiding layer 3 and thus offering the light so reflected again to the polarization-selective beam-splitting interface 9. To improve polarization contrast the end face opposite the entry side face may be provided with light absorbing means.

The waveguide in accordance with the invention may be manufactured using conventional processing methods. An optically isotropic polymeric waveguiding layer 3 may be manufactured using extrusion or, better, by means of injection molding as it allows the formation of complex shapes and thus integration of functionality. An optically anisotropic polymeric layer for use a waveguiding layer or a polarization-selection layer may be formed by uniaxially or biaxially stretching an isotropic polymer layer, in-situ polymerizing (crosslinking) a layer of oriented LC monomers, or by orienting an LC polymer above its glass transition temperate and cooling below that temperature. The polarization-selection layer and waveguiding layer may be combined by laminating a pre-formed polarization-selection layer and a pre-formed waveguiding layer together, optionally in combination with a supporting backing foil to provide mechanical strength for easy handling. Lamination is in particular attractive if the layers to be combined are relatively thick, say about 100 µm or more. If the waveguiding layer or the polarization-selection layer is relatively thin, say about 100 µm or less, it is attractive to print, coat or otherwise wet deposit the thin layer on the other layer. If the polarization-selection layer 11 is formed from an in-situ polymerized LC polymer, the polarization-selection layer may be manufactured by sandwiching the monomeric LC material between two substrates one of which is or includes the waveguiding layer 3 and polymerizing the LC monomer to form the polymer. After polymerization, the substrate opposite the waveguiding layer 3 may be removed, as would be the case in the manufacture of the waveguide 1, or left in position, as would be the case in the manufacture waveguide 31. In order to form the relief-structured surface 13 in the polarization-selection layer 11 of waveguide 1 the substrate may be provided with a corresponding relief-structured surface.

The relief structured surface may be formed by conventional methods such as injection molding, replication molding, etching, cut using a diamond cutter or embossing. In case the polarization-selection layer is formed by laminating an LC polymer on the waveguiding layer 3 embossing the polarization-selection layer is a preferred method of providing the relief structure. In case a separate outcoupling layer is employed, the outcoupling layer may be used as a releasable stamp in the embossing procedure or releasable mold in the molding process.

The exit surface and relief-structured surface may be adapted to co-operate with the object to be illuminated. In particular, if the object is a display panel, specifically a pixelated display panel, the exit surface and relief-structured surface may be patterned such that light is specifically directed to the pixels of the display panel. If the display panel is multi-color or full-color, color selection means may be incorporated in the waveguide such means may be for example a diffractive grating layer patterned into distinct gratings, each grating being capable of selectively redirecting light of a specific color, such as red, green or blue.

The waveguide and side-lit illumination arrangement in accordance with the invention may be used to illuminate any object, a preferred object being a display device.

Figure 4:
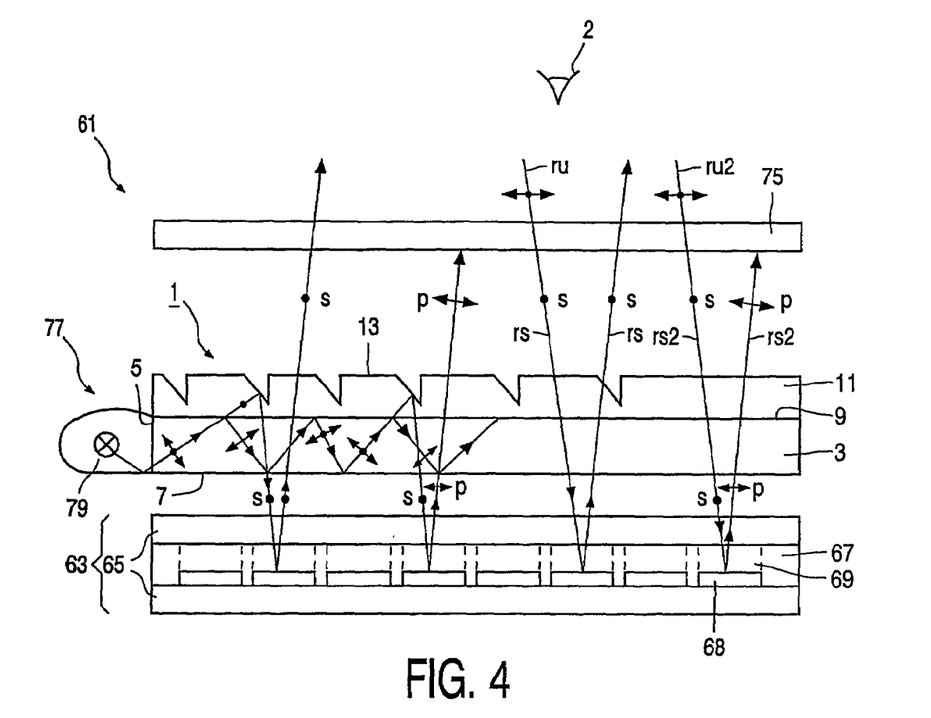
FIG. 4 shows, schematically, in a cross-sectional view, a display device comprising a side-lit front-light illumination arrangement in accordance with the invention.

FIG. 4 shows, schematically, in a cross-sectional view, a display device comprising a side-lit front-light illumination arrangement in accordance with the invention. The front-lit display device 61 is a reflective display and has a display panel for modulating polarized light in response to an applied voltage in the form of an LC cell 63 comprising glass substrates 65 between which an LC layer 67 is disposed. Other non-emissive display cells may be used as well.

In the LC layer 67, individually addressable pixels 69 are defined using reflective Al electrodes 68. In this example, a (super) twisted nematic cell is employed. With a pixel 69 in the addressed state, the polarization of light transmitted by the cell 63 is not changed. With a pixel 67 in the non-addressed state, the polarization is changed by 90° or an odd multiple thereof.

The display device 61 has a single linear absorbing polarizer 75 arranged between the cell 63 and the viewer 2 which in the present embodiment absorbs p-polarized and transmits s-polarized light.

A side-lit front-light arrangement 77 is arranged between polarizer 75 and display cell 63. The arrangement 77 has a light source 79 arranged near the entry side face 5 of the waveguide 1 shown in FIG. 1.

In operation, using ambient light, an ambient light ray ru is polarized by polarizer 75 to a polarized, say s-polarized, light ray rs which passes the waveguide 1 undisturbed. Incident on a pixel 69 in the addressed state, the light ray rs is transmitted by the LC layer 67, reflects off the electrode 68 and passes the LC layer 67 again, all without changing polarization. Since the polarization has not changed when the ray rs reaches the polarizer 75 again, and is transmitted by the polarizer 75. On the other hand, when an ambient s-polarized ray rs2 is incident on a non-addressed pixel, the polarization is changed thus forming the light p-polarized light ray rp2, the light ray rp2 then being absorbed by the polarizer 75. With the front-light arrangement 77 switched on when ambient light levels are insufficient to afford comfortable viewing, the s-polarized component of light from light source 79 is transmitted by the polarization-selective beam-splitting interface 9 and redirected by the relief-structured layer 13 towards the exit surface 7 and leaves the waveguide 1 to illuminate the display cell 63. The p-polarized light component of the waveguided light is totally internally reflected by the polarization-selective beam-splitting interface 9 and waveguided further down the waveguiding layer 3. Depolarization in the waveguiding layer 3 occurs and the depolarized light is incident again on the polarization-selective beam-splitting interface 9 further down the waveguide 1, thus recycling the p-polarized light component. Use of the waveguide 1 in the front-light arrangement 77 results in a bright and light-efficient display device.

In a modified embodiment of the display device 61 the reflecting electrodes 68 are replaced with transmissive, for example indiumtinoxide, electrodes. To reflect the desired light rays towards the viewer 2 a reflector should then be arranged behind the display panel 63.

Figure 5:
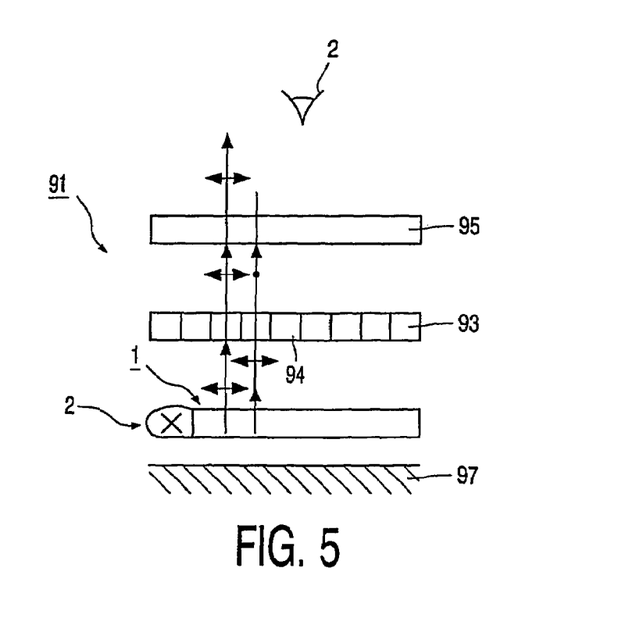
FIG. 5 shows, schematically, a transmissive display device having a side-lit back-light arrangement in accordance with the invention.

FIG. 5 shows, schematically, a transmissive display device having a side-lit back-light arrangement in accordance with the invention.

The display device 91 is a transmissive device comprising a display LC cell 93 having individually addressable pixels 94. Arranged between the viewer 2 and the display cell 93, a linear absorbing polarizer 95 is provided which absorbs s-polarized and transmits p-polarized light. A side-lit back-light arrangement comprising a light source 2 and a waveguide 1 in accordance with the invention illuminates the display cell 93 from the back In order to reflect stray light from the light source 2 a reflector 97 may be arranged behind the waveguide 1. Optionally, to further increase the polarization contrast of light emitted by the waveguide 1 a clean-up linear absorbing polarizer may be arranged between the waveguide 1 and the display cell 93.

In the embodiments described hereinabove the waveguide selectively emits linearly polarized light. This is not essential. The waveguide in accordance with the invention may also be adapted to emit circularly polarized light as shown in FIG. 6.

Figure 6:
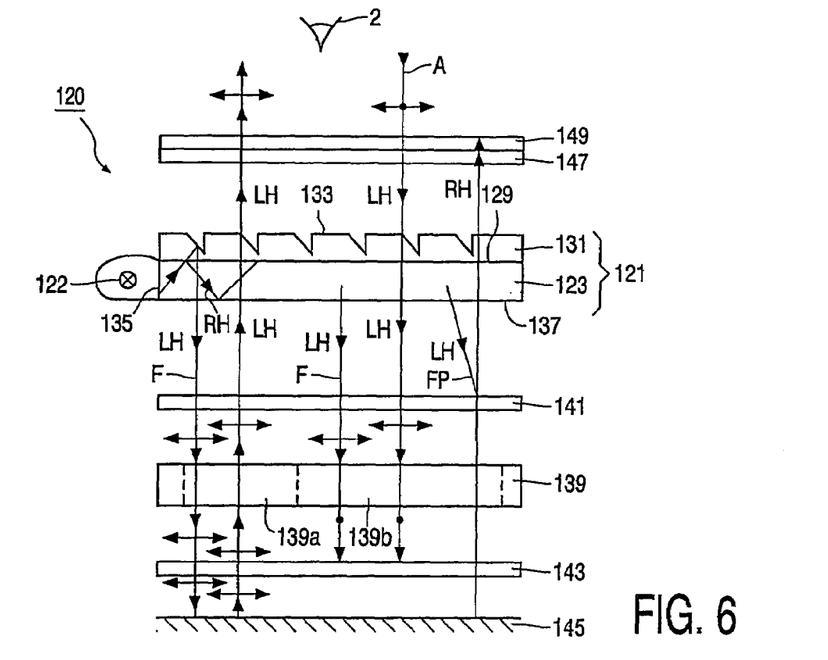
FIG. 6 shows, schematically, in a cross-sectional view, a further embodiment of a display device comprising a polarized-light-emitting waveguide in accordance with the invention.

FIG. 6 shows, schematically, in a cross-sectional view, a further embodiment of a display device comprising a polarized-light-emitting waveguide in accordance with the invention.

The display device 120 is a reflective display device. It comprises a waveguide 121 in accordance with the invention which together with the light source 122 forms an illumination arrangement in accordance with the invention. In operation, the waveguide emits, via the exit surface 137, left-handed circularly polarized light LH. Polarized light emission is achieved by entry of unpolarized light, via the entry side face 135, into the waveguiding layer 123 and incidence on the polarization-selective beam-splitting interface 129. The polarization-selective beam-splitting interface 129 is adapted to split unpolarized light into a totally internally reflected beam of right-handed circularly polarized light RH and a transmitted beam of left-handed circularly polarized light LH. The desired beam splitting is obtained by interfacing the waveguiding layer 123 with a polarization-selection layer 131 which is adapted to selectively reflect right-handed circularly polarized light and transmit left-handed polarized light. Such layers are known per se and are typically made from cholesterically ordered materials. In EP 606940, for example, cholesteric polarizers capable of selectively reflecting the entire visible wavelength range are disclosed. In order to make the polarizers disclosed therein suitable for reflecting light incident at waveguiding angles instead of normal incidence the helical pitch of the cholesteric material has to be made smaller. In doing so, the reflection band for normal incident shifts into UV range of the spectrum and, accordingly, the polarizer becomes more transparent for ambient visible light which is incident at normal or near-normal angles. In order to obtain effective reflection the polarization-selection layer 131 is to have a minimum thickness corresponding to about 4 times the pitch of the chiral nematic material from which the polarization-selection layer 131 is formed. Typically, the thickness is about 1 to 10 μm. As is well known, the wavelength λ of the reflected light is related to the pitch p by λ=n.p where n is the average refractive index of the chiral nematic material.

The LH circularly polarized light transmitted into the polarization-selection layer 131 by the polarization-selective beam-splitting interface is then incident on the relief-structured surface 133 which directs the light, via the exit surface 137, out of the waveguide towards a display panel for modulating polarized light in response to an applied voltage, which in the present embodiment is formed by the (super) twisted nematic (S)TN cell 139 comprising a plurality of individually addressable pixels.

In the present embodiment, the exit surface 137 and relief-structured surface 133 are separate and located on opposite sides of the polarization-selection layer 131. This arrangement is preferred but not essential, alternatively the exit surface may be on the same side as or even be coincident with the relief-structured surface. Furthermore as an alternative embodiment, the relief-structured surface 133 and the polarization-selective beam-splitting interface 123 may be combined to form a single relief-structured polarization-selective beam-splitting interface as a result of which the component reflected by the polarization-selection layer is coupled out of the waveguide and the transmitted component is waveguided further down the waveguide.

The waveguide 121 emits LH polarized light indicated by beams F. In order to present linearly polarized light to the cell 139 a quarter wave layer 141 is situated between the cell and the waveguide 121. If a pixel such as the pixel 139a is in the addressed state, the linearly polarized light is transmitted unaltered, whereas if a pixel is in the non-addressed state such as the pixel 139b the polarization is rotated by 90° to obtain the complementary linear polarization. After passing the (S)TN cell 139 the light is incident on the linear polarizer 143 which is arranged such that in the addressed state light is transmitted and the non-addressed state light is absorbed. The light transmitted by the polarizer 143 is reflected by the reflector 145 and on its way back passes the polarizer 143 and cell 139 unaltered. The quarter wave layer 141 transforms the linearly polarized light beam into a LH polarized light beam. The LH beam passes the front light unaltered and is incident on the quarter wave layer 147 by which the RH beam is linearly polarized. The linearly polarized light beam then passes the linear polarizer 149 arranged to transmit p-polarized light and reaches the viewer 2. Thus in summary, with the front light on, in the addressed state a pixel of the display appears bright, in the non-addressed state dark. With respect to ambient light (indicated in FIG. 6 by beam A), the display operates in the same manner because unpolarized light is transformed into left-handed circularly polarized light by the polarizer 149-quarter wave layer 147 combination.

Figure 7:
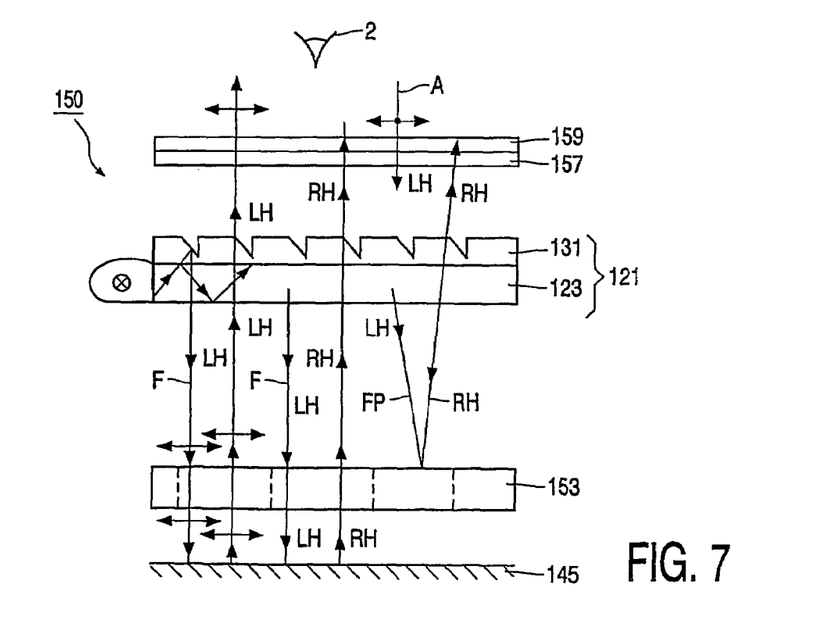
FIG. 7 shows, schematically, in a cross-sectional view, a still further embodiment of a display device comprising a polarized-light-emitting waveguide in accordance with the invention.

FIG. 7 shows, schematically, in a cross-sectional view, a still further embodiment of a display device comprising a polarized-light-emitting waveguide in accordance with the invention.

The display 150 comprises the same waveguide as the waveguide used in the previous embodiment but differs in that the display panel for modulating polarized light in response to an applied voltage is now in the form of a switchable quarter wave layer 153 which in the addressed state provides a retardation of a quarter wavelength and in the non-addressed state no retardation. In the addressed state, LH polarized light is reflected towards the viewer 2 and in the non-addressed state RH polarized light. In order to differentiate between the addressed state and the non-addressed state an analyzer consisting of a quarter wave layer 157 and a linear absorbing polarizer 159 to selectively absorb RH polarized light is positioned between the viewer 2 and the waveguide 121. Ambient light A is transformed into LH polarized light by the linear polarizer-retarder combination 147-149.

An advantage of waveguides emitting circularly polarized light as opposed to those emitting linearly polarized light is that parasitic reflections off the various interfaces (such as the reflections encountered by light beams FP shown in FIGS. 6 and 7) which ambient or front light encounter in passing through to reach the viewer are suppressed by the polarizer-retarder combination arranged between the viewer and the front light thus increasing the contrast of the display. After all, upon (parasitic) reflection the handedness of circularly polarized light is changed so in a display where the light emitted by the front light is left-handed the parasitic reflections of that light typically are right-handed and thus absorbed by the linear polarizer 149 or 159 after having passed the retarder 147 or 157.

The invention claimed is:

1. A polarized-light-emitting waveguide comprising:
    an entry side face via which, in operation, light from a light source arranged adjacent the entry side face enters the waveguide;
    a waveguiding layer for waveguiding light entered via the entry side face;
    an exit surface via which, in operation, polarized light exits the waveguide;

a polarization-selection layer provided adjacent to the waveguiding layer and, preferably, opposite the exit surface;
a planar polarization-selective beam-splitting interface formed at an interface of the waveguiding layer and the polarization-selection layer;
a relief-structured surface which is situated on the polarization-selection layer side of and is spatially separated from the polarization-selective beam-splitting interface, the relief-structured surface being adapted to redirect light polarized by the beam-splitting interface and incident on the relief-structured surface, via the exit surface, out of the waveguide; and
the waveguide comprises an outcoupling layer having a major surface in which the relief-structured surface is accommodated, the outcoupling layer being provided on the side of the polarization-selection layer facing away from the exit surface.

2. A waveguide as claimed in claim 1 wherein the outcoupling layer is optically isotropic.

* * * * *